United States Patent
Honda et al.

(10) Patent No.: US 6,847,435 B2
(45) Date of Patent: Jan. 25, 2005

(54) LASER DISTANCE MEASURING APPARATUS

(75) Inventors: Tatsuya Honda, Osaka (JP); Hiroshi Maeda, Katano (JP); Takashi Kishida, Hirakata (JP); Kazunari Yoshimura, Hirakata (JP); Kazufumi Oogi, Takatsuki (JP); Hideshi Hamaguchi, San Jose, CA (US); Yoshimitsu Nakamura, Settu (JP); Kuninori Nakamura, Owariasahi (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/601,703

(22) Filed: Jun. 24, 2003

(65) Prior Publication Data

US 2004/0051860 A1 Mar. 18, 2004

(30) Foreign Application Priority Data

Jun. 25, 2002 (JP) ........................................ 2002-185273
Dec. 20, 2002 (JP) ........................................ 2002-371060

(51) Int. Cl.$^7$ .......................... G01C 3/08; G01B 11/26; G01B 11/02
(52) U.S. Cl. ................. 356/4.01; 356/141.2; 356/141.5; 356/635
(58) Field of Search .................... 356/141.1, 3.01–5.15, 356/635, 141.2, 141.5

(56) References Cited

U.S. PATENT DOCUMENTS

| | | | |
|---|---|---|---|
| 3,751,169 A | * | 8/1973 | Fornerod ................... 356/141.4 |
| 4,513,504 A | * | 4/1985 | Nussbaumer et al. ........ 33/1 H |
| 4,656,743 A | * | 4/1987 | Thiemann et al. ........... 33/1 H |
| 4,666,300 A | * | 5/1987 | Zollman et al. ........... 356/141.3 |
| 6,480,289 B1 | * | 11/2002 | Shimomura et al. ........ 356/614 |

FOREIGN PATENT DOCUMENTS

| | | |
|---|---|---|
| JP | 5288549 | 11/1993 |
| JP | 642927 | 2/1994 |
| JP | 835820 | 2/1996 |
| JP | 9113266 | 5/1997 |

OTHER PUBLICATIONS

English Language Abstract of JP Appln. No. 5–288549.
English Language Abstract of JP Appln. No. 6–42927.
English Language Abstract of JP Appln. No. 8–35820.
Englsih Language Abstract and Translation of JP Appln. No. 9–113266.

* cited by examiner

*Primary Examiner*—Bernarr E. Gregory
*Assistant Examiner*—Brian Andrea
(74) *Attorney, Agent, or Firm*—Greenblum & Bernstein, P.L.C.

(57) ABSTRACT

A laser distance measuring apparatus, for measuring the distance between objects existing in two directions at least as seen from the apparatus by using laser light, comprises two projectors for projecting laser beams along a specified projection axis toward each one of the objects, a photo detector for receiving reflected light of projection from each object, a distance measurement processor for measuring the distance from a reference point of the apparatus to each object on the basis of the reception signal to the projection by the photo detector, and a distance calculation processor for calculating the distance between the objects on the basis of the distance data measured by the distance measurement processor and the angle formed by two projection axes, in which the projection axis by one projector is variable in angle with respect to the other projector. Therefore, the distance between objects can be measured easily and at high precision by one distance measuring operation only.

16 Claims, 17 Drawing Sheets

MAGNIFIED VIEW OF D

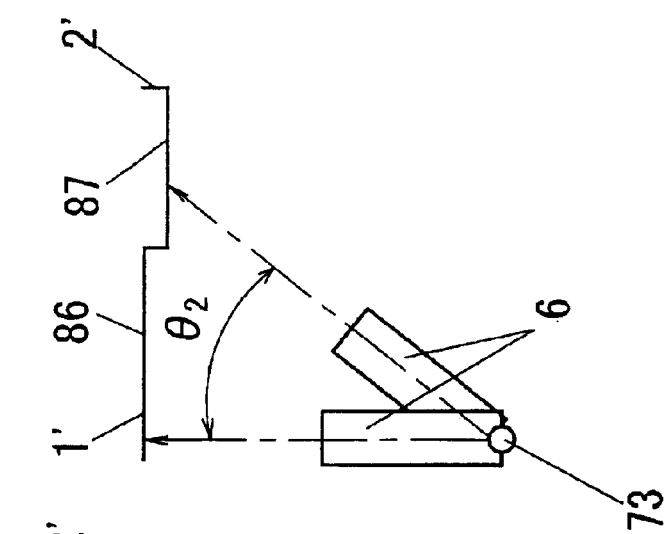
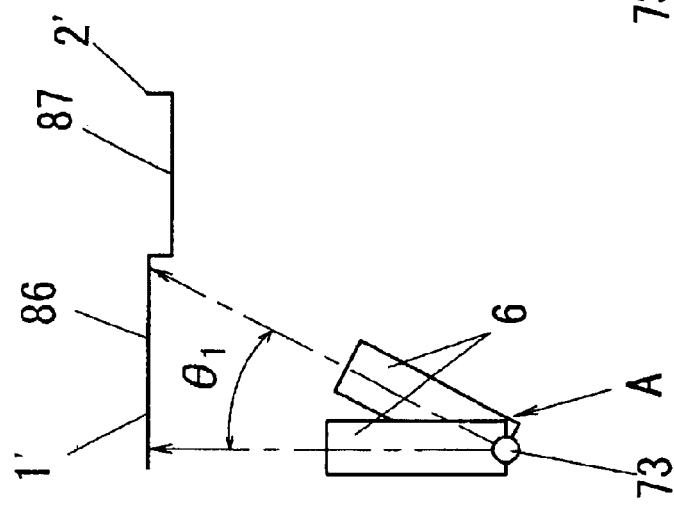

# LASER DISTANCE MEASURING APPARATUS

BACKGROUND OF THE INVENTION

1. Field of the Invention

The present invention relates to a laser distance measuring apparatus for calculating the distance between wall surfaces used, for example, in housing construction site or electric work site.

2. Description of the Prior Art

As distance measuring apparatus of this kind, hitherto, a dimension measuring apparatus 20 as shown in FIG. 23A is known (for example, see Japanese Laid-Open Patent Publication No. HEI 8-35820). This dimension measuring apparatus 20 comprises a cursor 22 sliding along a bar member 21, an encoder for generating a pulse at every specific moving distance of the cursor 22, photo detectors 23a, 23b for detecting the laser beam, an LCD device 24, and others. The method to use this apparatus 20 is shown in FIG. 23B, in which a laser projector 26 is installed at a reference position in a room 25, light beams are emitted in four orthogonal directions B1, B2, B3, B4, this apparatus 20 is placed in the room 25 in solid line state and broken line state, and while the cursor 22 is moved along the bar member 21, the light beam is detected by the photo detectors 23a, 23b, and the moving distance of the cursor 22 at this time is read. Thus, the dimensions of the room 25 are measured.

As other conventional distance measuring apparatus, a dimension measuring apparatus 30 as shown in FIG. 24A is known (for example, see Japanese Laid-Open Patent Publication No. HEI 5-288549). This apparatus 30 comprises a turntable 32 rotatably mounted on a base 31, a motor 35 for rotating and driving it, a rotary encoder 33 for generating pulses in the number proportional to the rotational angle of the turntable 32 on the base 31, a laser range finder 34 mounted on the turntable 32, and others. The method to use this apparatus 30 is shown in FIG. 24B, in which reflectors (not shown) are installed at reference points X, Y, Z of a room 25 to be measured, the numerical count of the counter when the laser range finder 34 of the apparatus 30 directs at angles θ2, θ3 is stored as angle data, and the output data from the laser range finder 34 is stored as distance data L1, L2, L3. Thus, the apparatus 30 is installed in the room 25, reflectors are placed at measuring points, and distance signals obtained by emitting from the laser range finder 34 to the reflectors is read out at every rotational angle θ2, θ3, and this process is repeated at every corner or specified reference point of the room 25. As a result, diagonal lengths S2, S3, and other dimensions of the room 25 can be measured.

In further different prior art, using a plurality of laser type displacement meters provided on a body of a running vehicle, the interval of laid rails is detected, the detection position is specified by an arithmetic unit, and the rail interval is evaluated (for example, see Japanese Laid-Open Patent Publication No. HEI 6-42927). In this laser type displacement meter, laser is emitted parallel to the axles at right and left gauge corners (wheel flange sides) of rails, and the distance between the rails is continuously determined from the reflected light.

In these dimension measuring apparatuses 20, 30 and rail interval measuring apparatus, however, the dimension of only one direction can be measured. That is, in order to measure the distance between two objects apart from each other, since one irradiating and measuring point of the apparatus is needed, the distance must be measured plural times by changing the apparatus installation state, using one end face of the two objects as the reference, or a reflector must be installed at the reference position, and it takes much time and labor, and it requires much experience and skill to enhance the precision of measurement. In a mechanism designed to rotate the entire apparatus, the structure is complicated and increased in size.

SUMMARY OF THE INVENTION

The invention is devised to solve the problems of the prior art, and it is hence an object thereof to present a laser distance measuring apparatus capable of measuring the distance of two arbitrary points by one measuring apparatus, without requiring any particular experience or skill, further capable of measuring the distance between two points easily and at high precision without making use of the end face of the object of measurement, and having a simple and small structure.

For achievement of the object, an aspect of the present invention provodes a laser distance measuring apparatus for measuring the distance between objects existing in two directions at least as seen from the apparatus by using laser light, comprises at least two projectors for projecting laser beams along a specified projection axis toward each one of the objects, a photo detector for receiving reflected light of projection from each object, a distance measurement processor which measures the distance from reference point of the apparatus to each object on the basis of the reception signal by the photo detector, and a distance calculation processor which calculates the distance between the objects on the basis of the distance data measured by the distance measurement processor and the angle formed by at least two projection axes, in which the projection axis by one projector is variable in angle with respect to the other one.

According to the invention, unlike the prior art, since it is not required to measure the distance between objects on the basis of one object of plural directions, it is possible to measure the distance between objects in plural directions easily and at high precision without changing the position of the laser distance measuring apparatus, by one measuring operation, without requiring experienced or skilled operator. Further unlike the prior art, it is not necessary to install a reflector or rotate the entire apparatus, and the entire measuring system is reduced in size. Besides, only by varying the projection angle of one projector from that of the other one, the distance in an arbitrary direction can be measured without moving the position of the laser distance measuring apparatus.

Preferably, in the laser distance measuring apparatus, the projectors and photo detector compose a detector, and plural sets of detectors are provided, and plural distance measurement processors are provided corresponding to the plural sets of detectors, and are capable of measuring the distance in plural directions by one distance measuring operation. In this configuration, having plural sets of detectors, objects at plural positions can be detected simultaneously, and the data from the detectors can be processed individually and simultaneously by the plurality of distance measurement processors.

Preferably, in the laser distance measuring apparatus, the projector has one light source, and the light beam from one light source is separated in two directions and emitted toward two objects. In this configuration, the light beam can be separated and emitted in two directions from one light source, and two light sources are not needed in the projection system.

Preferably, in the laser distance measuring apparatus, the projector has semiconductor laser of both-side emission for projecting light beams in two directions. In this configuration, the light beam can be emitted in two directions from one semiconductor laser, and it is not necessary to install a plurality of beam splitters or similar members on the optical path of the exit light.

Preferably, in the laser distance measuring apparatus, the photo detector has one sensor for detecting reflected lights from plural objects sequentially by way of plural optical fibers. In this configuration, reflected lights from plural objects are taken into plural optical fibers, and reflected lights from optical fibers are sequentially processed by one sensor in the photo detector, and plural photo detectors are not needed.

Preferably, the laser distance measuring apparatus further comprises a beam splitter capable of changing over freely between a state positioned on the optical path of the reflected light and a state dislocated from the optical path, in which reflected lights from plural objects are received by changing over sequentially by a single photo detector. In this configuration, by changing over the position of the beam splitter disposed on the optical path of the reflected light, the reflected lights from plural objects can be sequentially detected by one photo detector. Hence, two photo detectors are not needed.

Preferably, in the laser distance measuring apparatus, the distance measurement processor is only one, and measures each distance to plural objects sequentially by changing over signal reception from the plural photo detectors. In this configuration, the distance measurement can be processed by one distance measurement processor, and the structure of arithmetic processor is simplified.

Preferably, in the laser distance measuring apparatus, a half-mirror is disposed on the optical path of the reflected light, and reflected lights from plural objects can be received by one photo detector by means of the half-mirror. In this configuration, by one photo detector, the reflected light from one object and the reflected light from other object are sequentially received by way of a half-mirror, and the reflected lights from plural objects can be received without changing the internal structure of the apparatus.

Preferably, in the laser distance measuring apparatus, the detector including the projector and photo detector is provided in two independent pieces, each being provided rotatably about the axis for varying arbitrarily the angle formed by the projection axis of the light beam, includes an angle detector for detecting the angle formed by the projection axes, and the angle data obtained by the angle detector is used as the angle formed by two projection axes for calculation of distance by the distance calculation processor. In this configuration, by opening two independent detectors about the axis of rotation, when the light beams are emitted to the objects in two directions to be measured, and the reflected lights from the objects are received and the distance to each object is measured, the intersecting angle of the axis of projection of two detectors can be detected by the angle detector. The angle data and the distance measurement data obtained from the two detectors are put into the distance calculation processor, and the distance between two points is calculated. Thus, by distance measuring operation, the dimension between the objects in two directions can be measured in a short time. It hence saves the conventional labor of measuring the distance between the objects by using one of the objects in plural directions as the reference. The two independent detectors are integrated by way of the axis of rotation, and the structure is simplified and compact, and it is easy to carry. As a result, a laser distance measuring apparatus of small size, low cost, and high precision is obtained.

Preferably, in the laser distance measuring apparatus, the angle detector comprises a protractor for measuring the angle of the two detectors, and an input device for entering the angle value read from the protractor into the distance calculation processor. In this configuration, when the two detectors are opened, the opening angle is read by a protractor, and this angle is put into the distance measurement process or by using an input device for entering data by pushing numeric keys such as pocket calculator. The structure of the angle detector is simplified, and data transmission and reception structure between the angle detector and distance calculation processor is simplified.

Preferably, in the laser distance measuring apparatus, the projection axis of at least one light beam when the two detectors are opened is in a parallel configuration to the installation plane of at least one detector. In this configuration, the distance between two points having an arbitrary angle can be measured simultaneously by using one laser distance measuring apparatus, and the projection axis of light beam is in a parallel position in relation to the plane of installation of the detector, and the distance between two arbitrary points can be measured precisely on the basis of the plane of installation regardless of the horizontality of the plane of installation. When the two detectors are opened by 180 degrees, the distance between two arbitrary points of walls in two directions can be measured precisely.

Preferably, the laser distance measuring apparatus further comprises a level vial for detecting that the installation plane of at least one detector is horizontal. In this configuration, when measuring the distance between two points having an arbitrary angle, the horizontal state of the detector can be accurately known by the level vial, and accurate values of measurement are collected.

Preferably, in the laser distance measuring apparatus, the distance calculation processor has a function of storing the combined data of the rotational angle as the angle formed by light beams of the two detectors and the distance measured at this angle. In this configuration, the angle data and distance measured at each angle are stored in the distance calculation processor, and a three-dimensional profile of the object planes of measurement can be restored from the stored data, and also the data stored after measurement can be processed in other information appliance.

Preferably, the laser distance measuring apparatus further comprises a mechanism for adjusting so that at least one detector may be maintained horizontal on the basis of the horizontal level detection result by the level vial. In this configuration, regardless of inclination of the place of installation of the laser distance measuring apparatus, the detector can be kept horizontal by operating the adjusting mechanism, and an accurate distance measurement is possible on the basis of the horizontal state of the laser distance measuring apparatus.

Preferably, the laser distance measuring apparatus further comprises a function of storing the combined data in an external storage medium. In this configuration, by storing the combined data in an external storage medium, the data can be carried in a format of recording medium, and data can be processed in an environment not suited to communication.

Preferably, the laser distance measuring apparatus further comprises a function of communicating the combined data

BRIEF DESCRIPTION OF THE DRAWINGS

FIG. 22A is an operation explanatory diagram having a function of storing combined data of rotation angle by detector and value of distance measured at the same rotation angle in other embodiment;

FIG. 22B is a diagram of the same;

FIG. 22C is a diagram of the same;

DETAILED DESCRIPTION OF THE PREFERRED EMBODIMENTS

Figure 1:
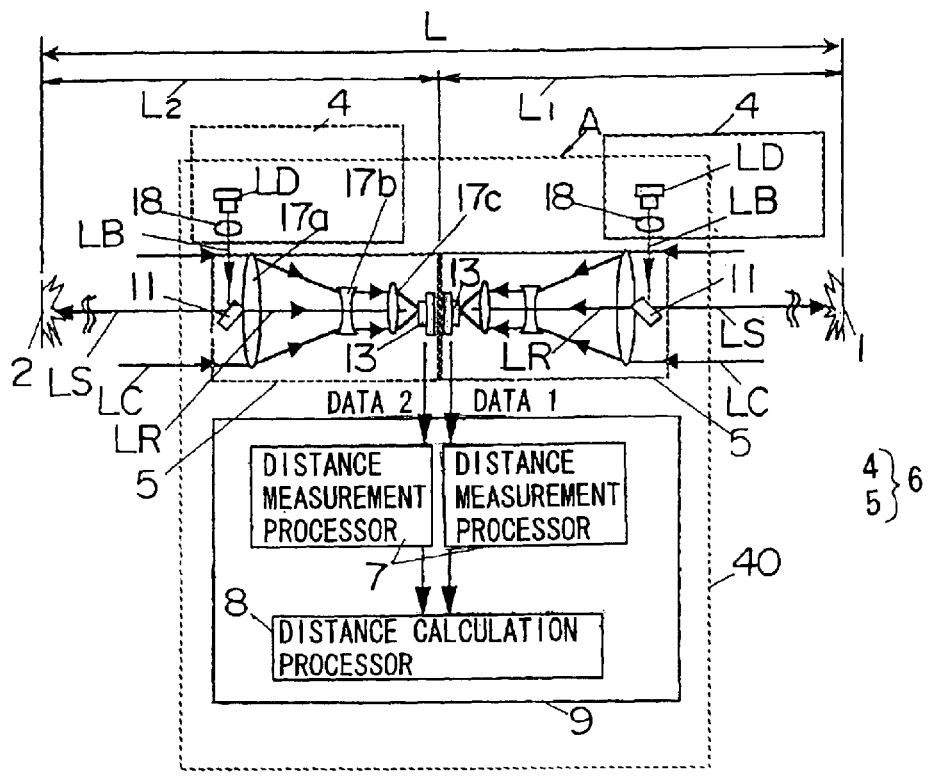
FIG. 1 is a schematic structural diagram of laser distance measuring apparatus in an embodiment of the invention.
Figure 2:
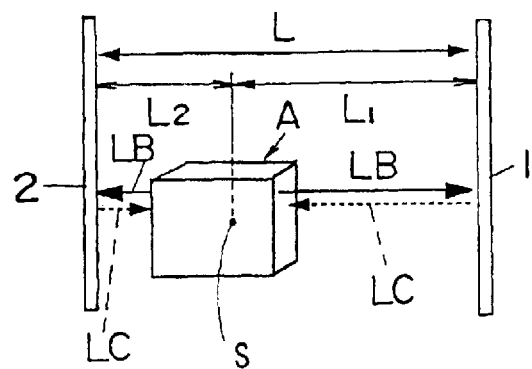
FIG. 2 is a diagram explaining the distance measuring operation of the apparatus.

Preferred embodiments of the invention are described below while referring to the accompanying drawings. FIG. 1 shows a schematic structure in 180-degree opened state of two independent detectors in laser distance measuring apparatus A, and FIG. 2 shows its distance measuring operation. This apparatus A is composed of one casing 40, and has a pair of detectors 6 each including a projector 4 for projecting light beam LB toward objects 1, 2 positioned in plural directions as seen from the apparatus, and a photo detector 5 for receiving the reflected light LC from the objects 1, 2. The apparatus A further comprises an arithmetic processor 9 each including a distance measurement processor 7 for receiving detection signals from the photo detectors 5 and measuring distances L1, L1 from the reference point S of the apparatus to the objects 1, 2, and a distance calculation processor 8 for calculating the distance L between the objects 1, 2 (=L1+L2) on the basis of the measured distance data.

Axes of projection of laser light by two projectors 4 are mutually variable in angle, and their mutual angle of 180 degrees is shown herein. In this example, the optical axis of the light beam LB from the semiconductor laser LD is bent by a beam splitter 11 to become signal light LS, which is directed toward the object. This optical axis toward the object is the axis of projection.

This apparatus A operates according to the algorithm of measuring the distance between certain objects in plural directions by one measuring operation. Two distance measurement processors 7 and one distance calculation processor 8 are realized by a microcomputer. One projector 4 emits M (one or plural) light beams LB toward one object, and M reflected lights LC are put into one photo detector 5. Other projector 4 emits N (one or plural) light beams LB toward other object, and N reflected lights LC are put into other photo detector 5.

Thus, having two detectors 6, two objects 1, 2 can be detected simultaneously, and having two distance measurement processors 7, the data from the detectors 6 can be processed individually without requiring any changeover in signal processing. As a result, the distance between objects can be measured by one measuring operation without moving the position of the laser distance measuring apparatus A. That is, it saves the labor of the prior art of measuring the distance between objects on the basis of one of the objects in plural directions, and the distance between objects in plural directions can be measured in a short time, easily and at high precision by one measuring operation without requiring experienced or skilled operator. Further, unlike the prior art, it is not necessary to install a separate reflector or rotate the entire apparatus, and it is compact and easy to carry compared with the prior art, and the entire measuring system can be reduced in size or lowered in cost.

The two detectors 6 of the apparatus are identical in structure and function. Explaining only one of them, light beam LB from the semiconductor laser LD provided in the projector 4 is put into the beam splitter 11 from a projection lens 18, and the light beam LB is separated into signal light LS and reference light LR by the beam splitter 11, and reflected light LC reflected by the object 1 and returning and reference light LR passing through the beam splitter 11 interfere with each other to generate a beat signal, and this beat signal is received by the photo detector 5, and distance L1 to the object 1 is measured on the basis of this beat signal. This is known as an optical heterodyne interferometric method. Light currents (beat signals) issued from the two photo detectors 5 are respectively put into two distance measurement processors 7, data of distance measurement up to the objects 1, 2 are created, and by adding the distances L1, L2 up to the objects 1, 2 in the distance calculation processors 8 based on the data, the distance L between the objects 1, 2 (between walls) of two front and rear positions is calculated. Inside of the photo detector 5, focusing lenses 17a, 17b, 17c are provided for focusing the reflected light LC to the sensor 13. Distance measurement by the distance measurement processor 7 may be executed by making use of time difference (TOF: Time of Flight method) or phase difference of reflected light to the laser irradiation light. If the TOF method is employed, the beam splitter 11 shown in FIG. 1 is replaced with a mirror or a half mirror, because the TOF method requires no reference light LR.

Figure 3A:
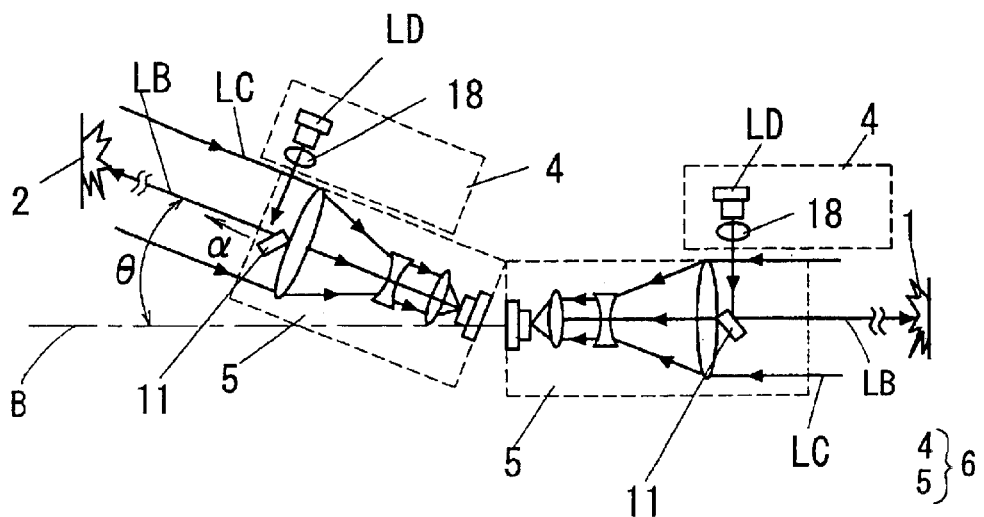
FIG. 3A is a structural diagram of a different embodiment.
Figure 3B:
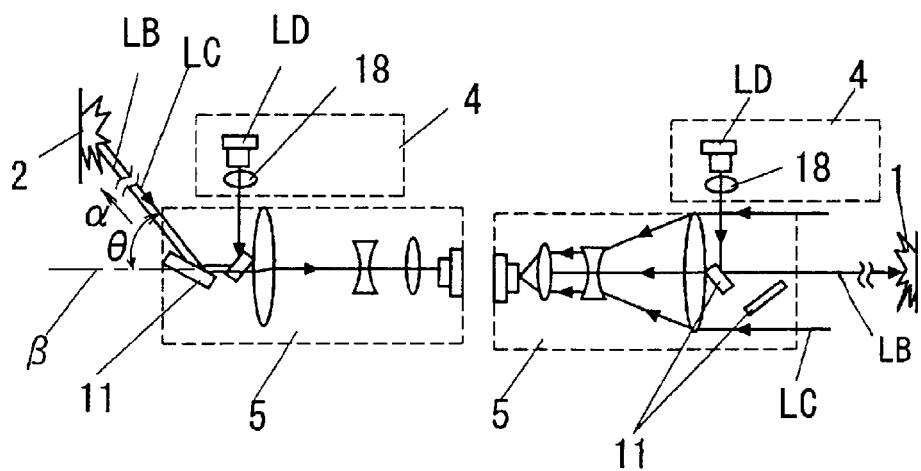
FIG. 3B is a structural diagram of a different embodiment.

FIGS. 3A and 3B show two detectors 6 of the laser distance measuring apparatus A, in which projection axis α by the projector 4 in one detector 6 is varied from projection axis β by the projector 4 in other detector 6. Other configuration is same as in FIG. 1. As shown in FIG. 3A, the entire angle of one detector 6 is variable with respect to the projection axis β. As shown in FIG. 3B, by disposing a total reflection mirror (beam splitter 11) capable of setting the angle arbitrarily on the exit light optical path, the projection axis α may be set variable with respect to the projection axis β. Having two detectors 6, if the detectors 6 are fixed in the optical system, the distance cannot be measured if the position of the two objects 1, 2 is inclined to the projection axis β as in the case of FIG. 3A or 3B. In this embodiment, by contrast, having two detectors 6, since one projection axis α is variable with respect to other projection axis β, the distance in an arbitrary direction can be measured without moving the position of the laser distance measuring apparatus A, so that the distance can be measured precisely without experience or skill.

Figure 4:
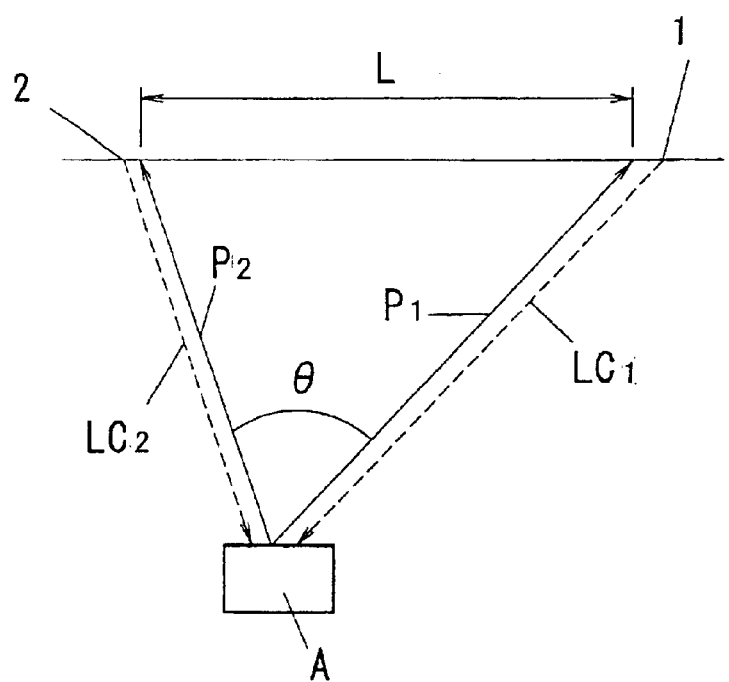
FIG. 4 is a diagram explaining the distance measuring operation of the apparatus.
Figure 5:
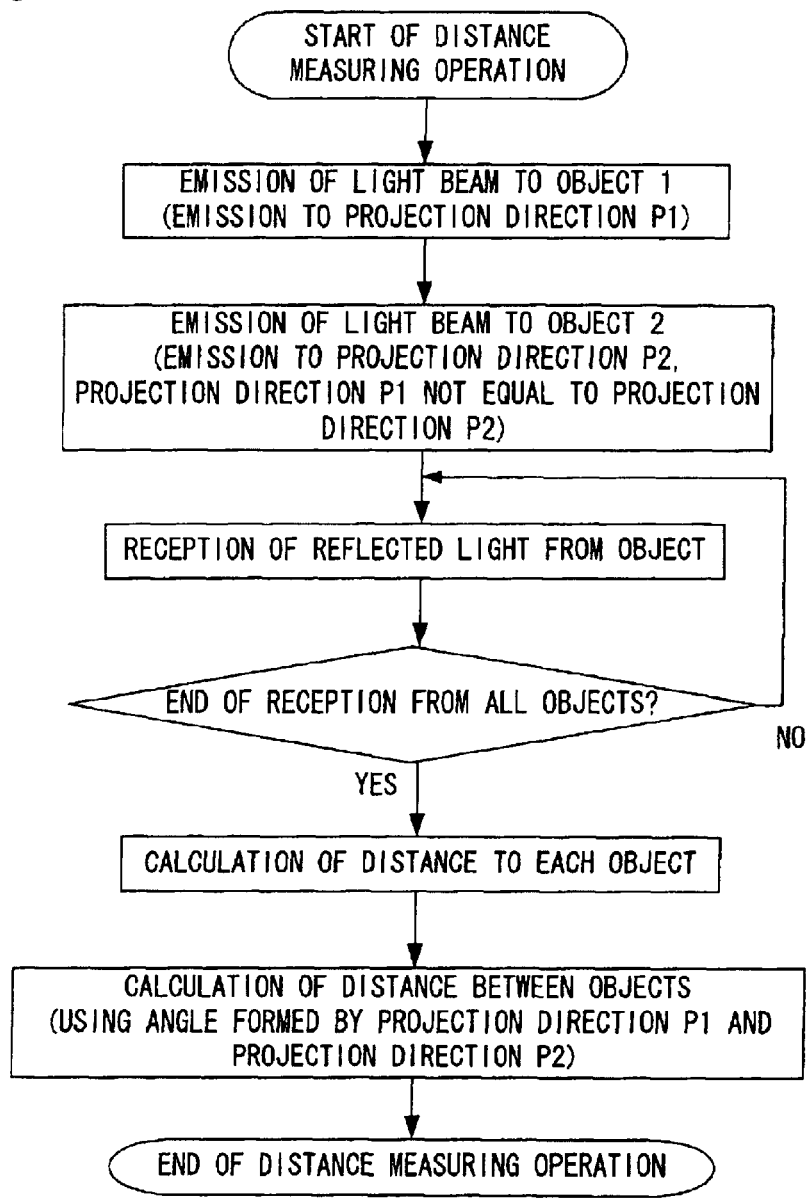
FIG. 5 is a processing flowchart of the apparatus.

In this embodiment, the angle θ formed between the projection axis α and projection axis β is used for calculation of distance between objects. FIG. 4 shows a case of measuring distance L between two points (between objects 1, 2) on the wall by an arbitrary angle θ by using the laser distance measuring apparatus A, and FIG. 5 shows a processing flow by the algorithm of calculation of distance in this case. First, light beam LB in one direction is emitted toward projection direction P1, and light beam LB in other direction is emitted to projection direction P2 (different from projection direction P1), and reflected light LC from two positions (objects 1, 2) of the wall surface is received. Upon completion of reception, distances Lc1, Lc2 to the objects 1, 2 are calculated, and the distance L between the objects 1, 2 is calculated. Herein, the distance L between two points is calculated in the following formula. In FIG. 4, supposing the arbitrary angle to be θ, the measuring distance in one direction to be Lc1, and the measuring distance in other direction to be Lc2, the distance L between two points is calculated according to formula (1).

$$\sqrt{Lc1^2 + Lc2^2 - 2 \times Lc1 \times Lc2 \times \cos\theta} \quad \text{(formula 1)}$$

Thus, without varying the laser distance measuring apparatus A, the distance L between two points enclosed by an arbitrary angle θ can be measured easily and at high precision. In FIG. 4, two positions on a same wall are supposed to be objects 1, 2, but the objects may be present on different walls.

Figure 6:
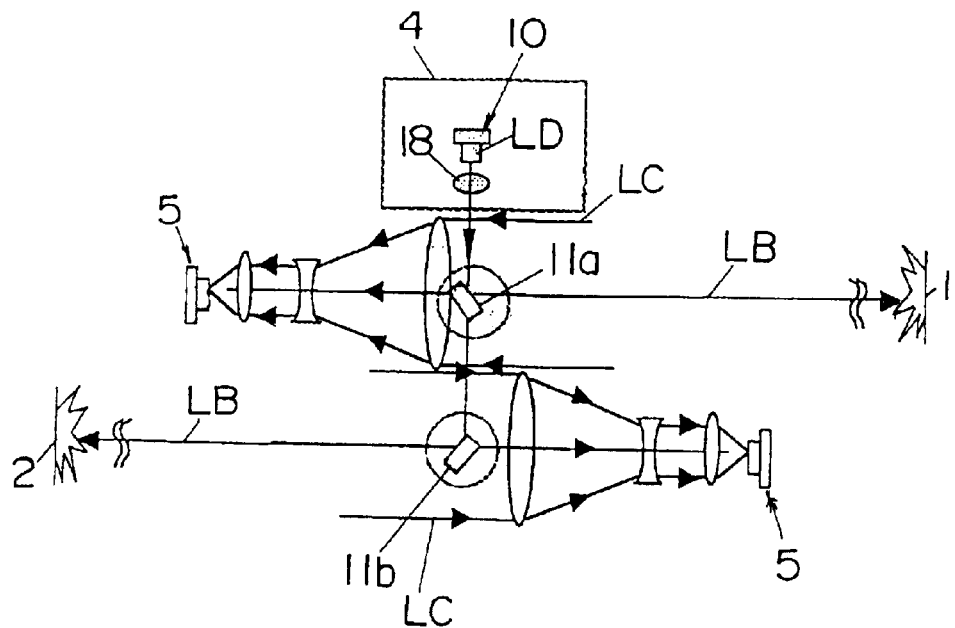
FIG. 6 is a structural diagram of a different embodiment.

FIG. 6 shows other embodiment, in which the projector 4 has one light source 10, and light beam LB from one light source 10 is separated and emitted in two directions of object 1 and object 2, and the distance between two directions is measured. Other configuration is same as in FIG. 1. Herein, the two projection axes form an angle of nearly 180 degrees. In this embodiment, light beam LB from semiconductor laser LD as one light source 10 of the projector 4 is guided into beam splitter 11a by way of projection lens 18, and divided into two portions, and one is emitted toward the object 1 (wall) and, other is emitted toward the beam splitter 11b and further emitted from the beam splitter 11b to the object 2 (wall). Reflected light LC from the object 1 is received in one photo detector 5, and reflected light LC from the object 2 is received in other photo detector 5. Process of calculation of distance is same as mentioned above. Thus, since the light beam LB is emitted in two directions, two light sources 10 are not needed in the projector 4, so that the laser distance measuring apparatus can be realized in a simple structure and a small size.

Figure 7:
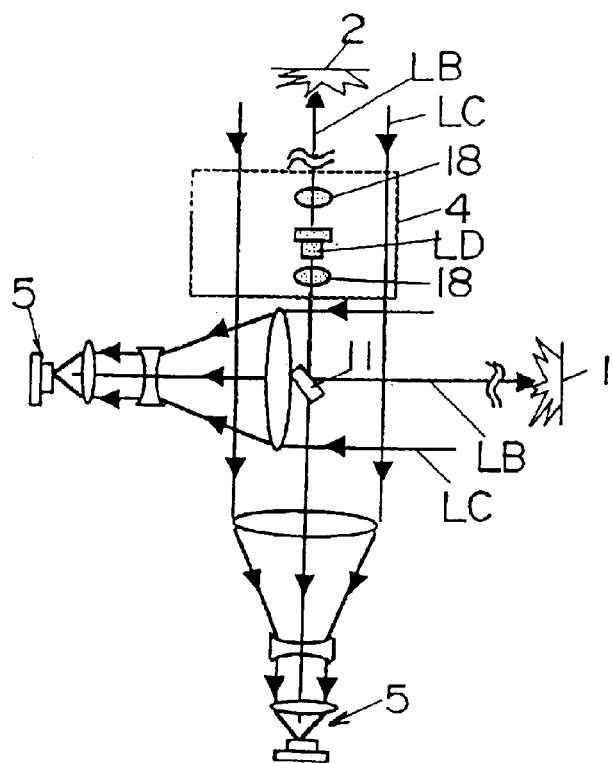
FIG. 7 is a structural diagram of a different embodiment.

FIG. 7 shows a different embodiment, in which the distance in two directions is measured by using one semiconductor laser LD of both-side emission as the projector 4. This apparatus has a function of emitting light beam LB in two directions of the object 1 and object 2, by making use of light beam LB in two directions of the semiconductor laser LD having a function of both-side emission of emitting the light beam LB in two directions above and beneath the emission plane. Other configuration is same as in FIG. 1. Herein, the two projection axes form an angle of 90 degrees. The semiconductor laser LD of both-side emission emits light beams LB in upper and lower directions by way of a pair of upper and lower projection lenses 18. The light beam LB emitted in the upper direction is reflected by the upper wall (object 2), and the reflected light LC is received by one photo detector 5 disposed upward. The light beam LB emitted in the lower direction is emitted to the wall (object 1) in the lateral direction by way of the beam splitter 11, and the reflected light LC is received by other photo detector 5 disposed sideways. Process of calculation of distance is same as mentioned above. The projection direction of the light beam LB by the semiconductor laser LD of both-side emission is not limited to upper and lower directions, but may be lateral direction.

Thus, only one semiconductor laser LD of both-side emission and one beam splitter 11 are needed, and it is not required to install two beam splitters 11a, 11b on the optical path of the light beam as shown in FIG. 6, and the light beam LB can be separated in two directions by one beam splitter 11, so that the internal structure of the laser distance measuring apparatus can be simplified.

Figure 8A:
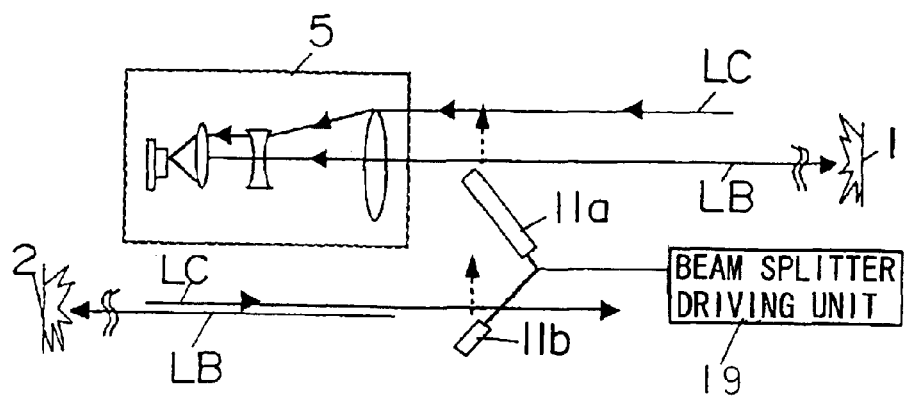
FIG. 8A is a structural diagram of a different embodiment.
Figure 8B:
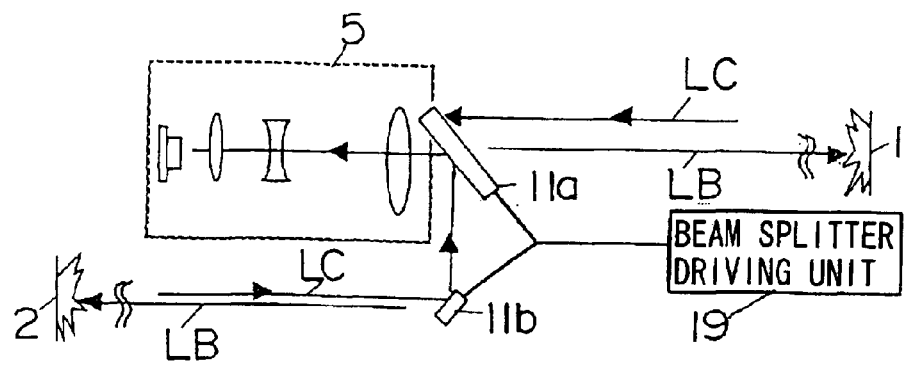
FIG. 8B is a structural diagram of the same.

FIGS. 8A and 8B relate to a further different embodiment, showing an example of selection of light beam LB to be received in the photo detector 5 by two beam splitters 11a, 11b. Herein, two axes of projection form an angle of nearly 180 degrees. Other configuration is same as in FIG. 1, and only different points are described. By changing over the position of the beam splitter 11a and beam splitter 11b disposed in a V form on the optical path of reflected light LC by means of a beam splitter driving unit 19, the reflected light LC to be detected by the photo detector 5 can be selected. In distance measuring operation, first as shown in FIG. 8A, without disposing the beam splitter 11a and beam splitter 11b on the optical path, light beam LB is emitted from the projector (not shown), and only the reflected light LC from the object 1 is directly received in the photo detector 5. Then, as shown in FIG. 8B, the beam splitter 11a and beam splitter 11b are disposed on the optical path by means of the beam splitter driving unit 19, and the optical path of the light beam LB is changed. By emitting the light beam LB in this state, only the reflected light LC from the object 2 is received in the photo detector 5. Calculation process of distance is same as in the foregoing embodiments. Thus, by changing over the position of the beam splitters 11a and 11b disposed on the optical path of the reflected light LC and cutting off all of reflected light LC from the object 1 while the beam splitter 11a is located on the optical path of the reflected light LC, the reflected lights LC from two objects 1, 2 can be sequentially received in one photo detector 5. As a result, two photo detectors 5 are not needed, and the laser distance measuring apparatus is reduced in size.

Figure 9:
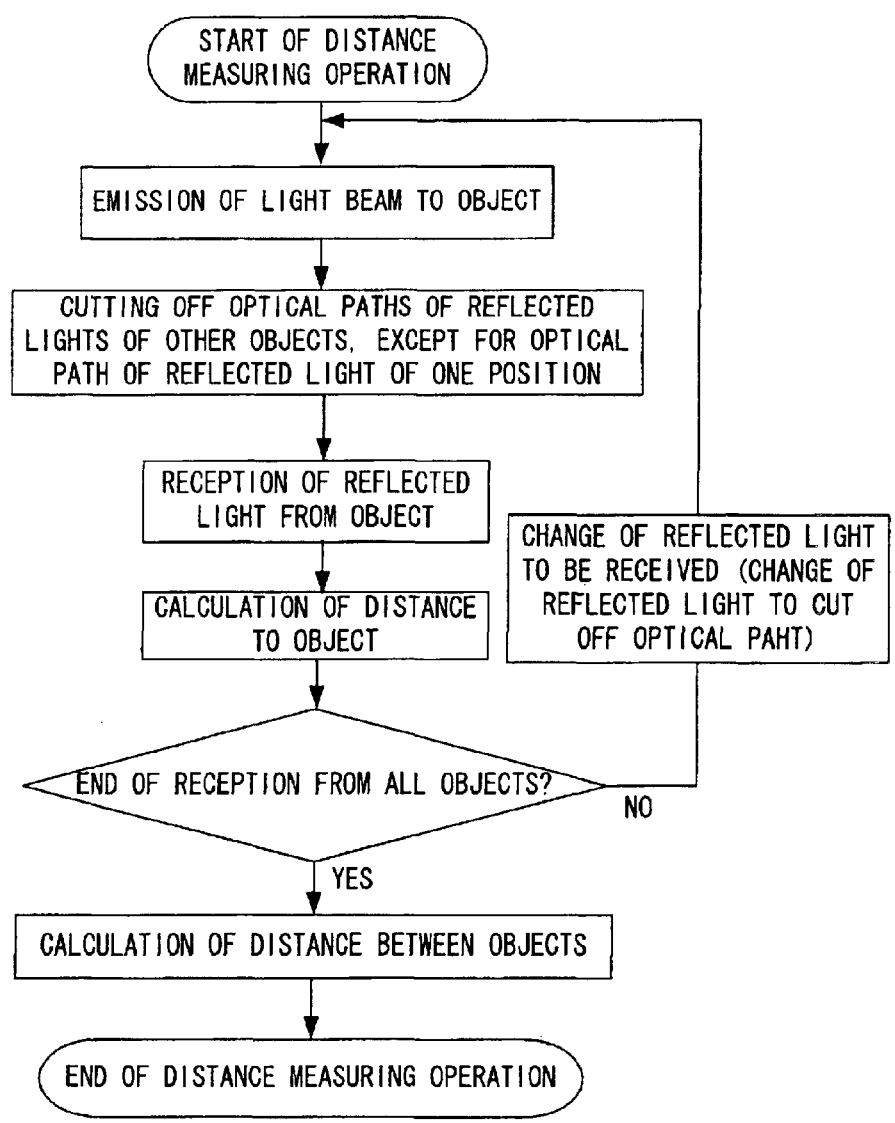
FIG. 9 is a processing flowchart of a different embodiment.

FIG. 9 shows an example of processing flow by algorithm of measuring the distance between objects by selecting the reflected light to be received. Emitting light beam to the object, when emission of light beam to all objects is over, the optical path of reflected light of other objects is cut off except for the optical path of reflected light of one position. In this state, the reflected light from the object is received, and the distance to the object is calculated. By changing the reflected light to be received (a structure for cutting off the optical path is used as the changing means), the same operation is repeated. When reception from all objects is over, the distance between objects is calculated. Thus, by changing over the optical paths of reflected light from plural objects, the reflected light to be received is selected, and the distance of each object is measured sequentially, and the distance between the objects is calculated. As a result, the reflected light from the plural objects occurring in one measuring operation can be accurately separated and received, and the distance can be measured at high precision.

Figure 10:
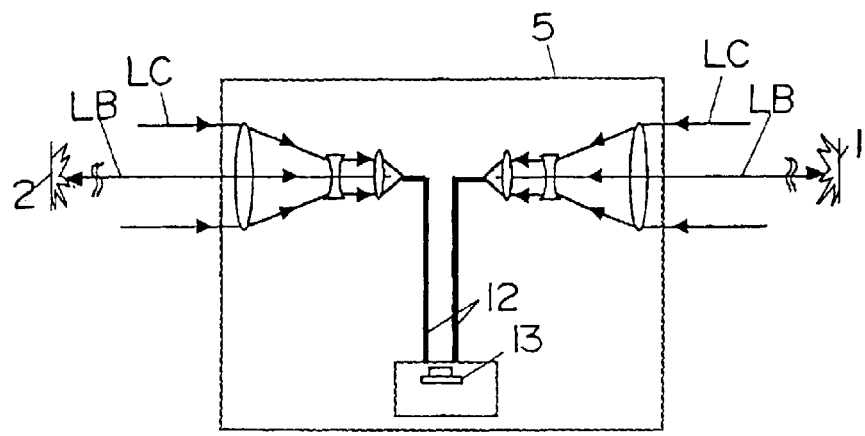
FIG. 10 is a structural diagram of other embodiment.

FIG. 10 shows an embodiment of changing over the reception of light beam LB by an optical fiber 12. In this embodiment, the reflected lights LC from the object 1 and object 2 are put into the optical fiber 12, and the reflected lights LC from the optical fiber 12 are sequentially processed in one sensor 13 in a common photo detector 5. Other configuration is same as in FIG. 1. Herein, two axes of projection form an angle of nearly 180 degrees. Calculation process of distance is same as mentioned above. Thus, the reflected lights LC from the two objects 1, 2 are sequentially detected by one sensor 13 of the photo detector 5 by using two optical fibers 12, and hence two photo detectors 5 are not needed for receiving reflected lights LC from two directions, so that the laser distance measuring apparatus is reduced in size.

Figure 11:
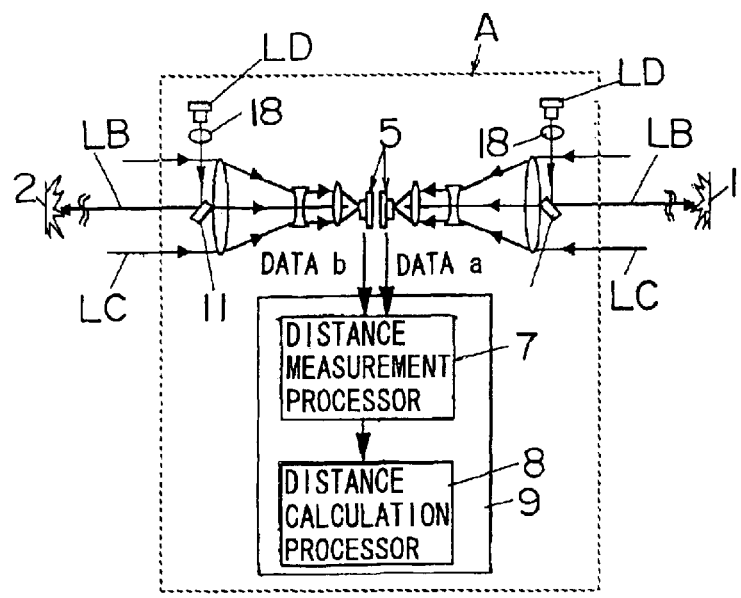
FIG. 11 is a structural diagram of other embodiment.

FIG. 11 shows an embodiment of changing over the distance measurement processor 7 by signal processing. Herein, one distance measurement processor 7 and one distance calculation processor 8 are provided in the processor of the laser distance measuring apparatus A. The distance measurement processor 7 changes over reception of data a and b from each photo detector 5 as for the object 1 and object 2 by signal processing, and sequentially calculates the distance to the objects 1 and 2. Other configuration is same as in FIG. 1. In this embodiment, the distance measurement processor 7 receives data a from the photo detector 5 as for the object 1, and measures the distance of the object 1, and changes over the data by signal processing, and receives data b from the photo detector 5 as for the object 2, and measures the distance of the object 2. Then, the distance calculation processor 8 calculates the distance between objects 1 and 2 in two directions. Thus, two processes of distance measurement can be done by one distance measurement processor 7, and the structure of the processor is simplified.

Figure 12:
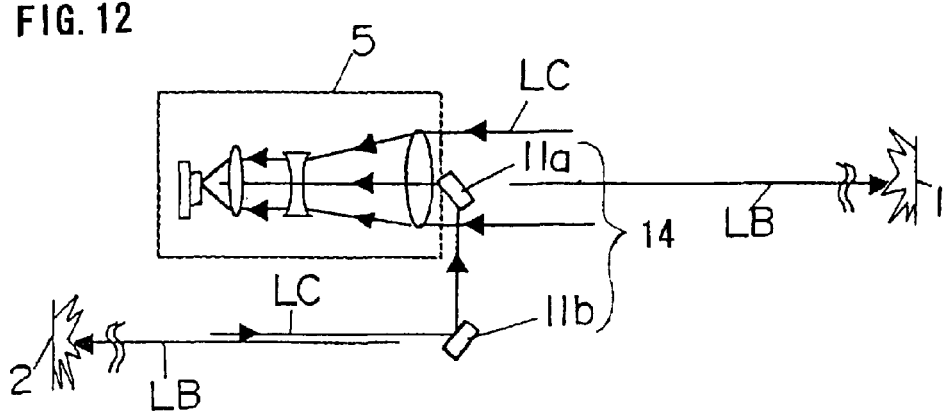
FIG. 12 is a structural diagram of other embodiment.

FIG. 12 shows an embodiment for changing over the reception of reflected light LC by a half-mirror 14. As the half-mirror 14, herein, beam splitter 11a and beam splitter 11b are disposed on the optical path of the reflected light LC. Other configuration is same as in FIG. 1. In this example, the optical path is changed so that reflected lights LC from the objects 1, 2 may reach the photo detector 5 from the half-mirror 14 and beam splitter 11b. The photo detector 5 sequentially receives the reflected light LC from the object 1 and the reflected light LC from the object 2. Calculation process of distance is same as in the foregoing embodiments. Thus, by disposing the half-mirror 14 on the optical path, the reflection from two objects 1, 2 can be received by one photo detector 5. Therefore, without changing the internal structure of the laser distance measuring apparatus, the reflected lights LC from the two objects 1, 2 can be sequentially received with the half-mirror 14 disposed on the optical axis, and the internal structure is simplified, and moving operation of the half-mirror 14 is not needed, and the distance can be measured easily.

Figure 13A:
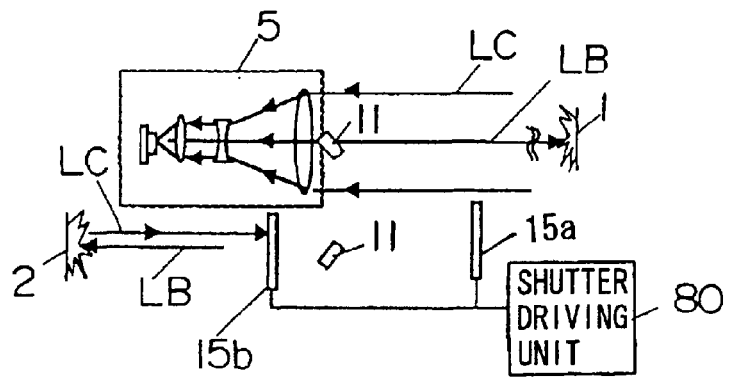
FIG. 13A is a structural diagram of other embodiment.
Figure 13B:
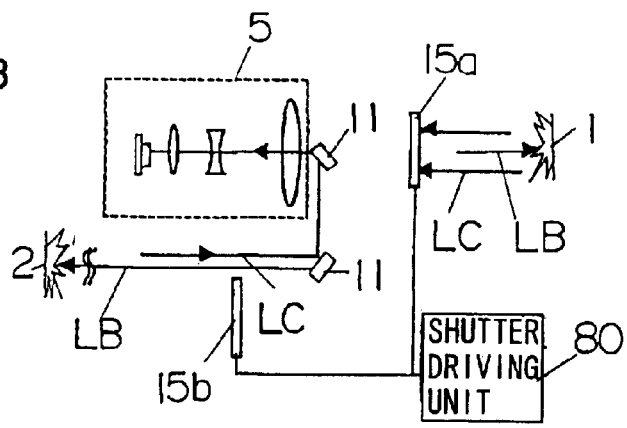
FIG. 13B is a structural diagram of the same.

FIGS. 13A and 13B show an embodiment of disposing movable shutter 15a and shutter 15b on the optical path of the reflected light LC from the objects 1, 2. The shutter 15a and shutter 15b are driven by a shutter driving unit 80, and the optical path of reflected light LC from objects 1, 2 can be cut off. When receiving the reflected light LC from the object 1, the shutter 15b is positioned on the optical path, and when receiving the reflected light LC from the object 2, the shutter 15a is positioned on the optical path. Other configuration is same as in FIG. 1. In distance measuring operation, first, the shutter 15b is positioned on the optical path of reflected light LC from the object 2, and the reflected light LC from the object 1 is received. Next, the shutter 15b is removed from the optical path of the reflected light LC from the object 2, and the shutter 15a is disposed on the optical path of reflected light LC from the object 1, and the reflected light LC from the object 2 is received. Calculation process of distance is same as in the foregoing embodiments. Thus, the reflected lights LC from two objects 1, 2 can be sequentially received in the photo detector 5 by changing over their passing mechanically, and two photo detectors 5 are not needed for receiving reflected lights LC from two directions, so that the laser distance measuring apparatus can be reduced in size.

Although not shown in the drawing, by using the liquid crystal instead of the shutter in the embodiment, reflected light optical paths from two objects can be changed over. As the liquid crystal, any crystal having control function of light permeability such as PLZT is used, and the optical path is cut off during power feed. In this case, the action is same as mentioned above.

Figure 14A:
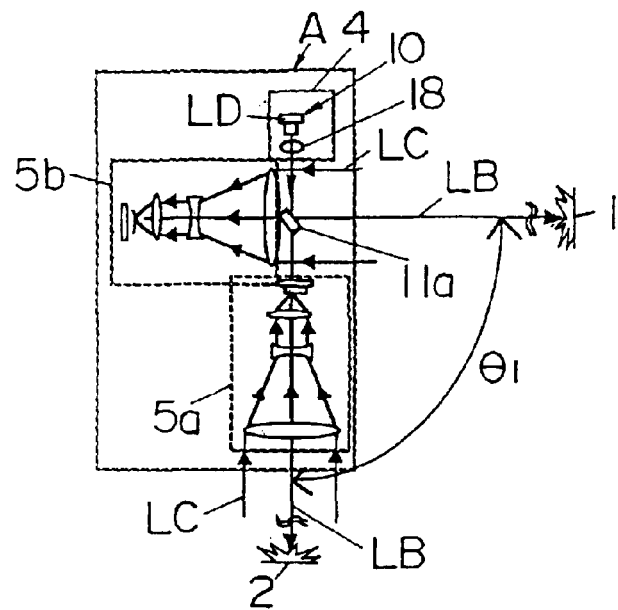
FIG. 14A is a plan view of further different embodiment.
Figure 14B:
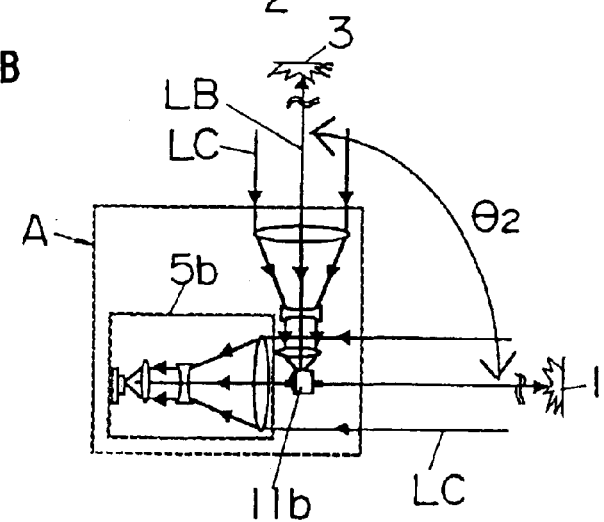
FIG. 14B is a side view of the same.
Figure 15:
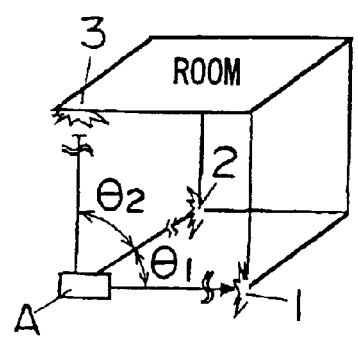
FIG. 15 is a perspective view showing an example of use of the same.

FIGS. 14A and 14B show an embodiment of laser distance measuring apparatus A capable of measuring in three orthogonal directions, and FIG. 15 shows an example of its use. Light beam LB from semiconductor laser LD as one light source 10 of projector 4 is branched by using beam splitters 11a, 11b, and is emitted in three directions at the positions of objects 1, 2, 3. Other configuration is same as in FIG. 1. In this example, light beam LB from projector 4 passes through the beam splitter 11a and beam splitter 11b, and is emitted in three directions (ceiling direction, wall direction, floor direction) of the object 1, the object 2 positioned at angle θ1 orthogonal horizontally thereto, and the object 3 positioned at angle θ2 orthogonal vertically thereto, and their reflected lights LC are received in the photo detector 5a and photo detector 5b. Calculation process of distance is same as in the foregoing embodiments. Thus, without moving the position of the laser distance measuring apparatus, the distance between wall surfaces can be measured from a corner of a room, and the size of the room can be measured easily and at high precision.

Referring now to FIG. 16A to FIG. 22, exemplary embodiments are described. The basic structure of the detector 6 (incorporating the projector and photo detector) of the laser distance measuring apparatus A is same as in the foregoing embodiments, and detailed description is omitted.

The laser distance measuring apparatus A shown in FIG. 16A to FIG. 18 comprises two independent detectors 6, each including a projector 4 for emitting light beam to objects 1, 2, and a photo detector 5 for receiving reflected lights from the objects 1, 2. The two independent detectors 6, 6 are rotatable about axis of rotation 73 in the intersecting portion of projection axis β of light beam, and compose a single distance measuring unit C. The apparatus A further comprises an angle detector 60 such as encoder for detecting the intersecting angle θ of projection axes β of the two independent detectors 6, 6, and an arithmetic unit 61 composed of microcomputer for calculating the distance L between two points by calculating the distance measurement data obtained from the distance measuring unit C and the angle data obtained from the angle detector 60. The outer shells of the two detectors 5, 5 for composing the distance measuring unit C are formed in independent flat box shapes, one side of each is mutually overlapped, and the base end portion (reference point S) of each detector 6 is coupled in a swivel manner about the common axis of rotation 73. The leading end portion of each detector 6 is an irradiation port of light beam. In one detector 6, the angle detector 60 and arithmetic unit 61 are incorporated, and an operation unit 74 and a display unit 75 are provided on the outer surface of this detector 6.

Figure 17B:
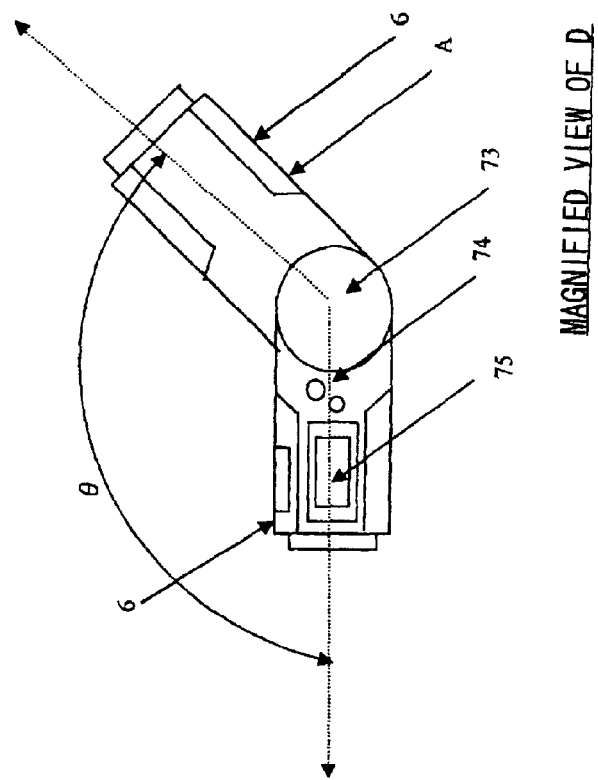
FIG. 17B is a magnified view of D of the same.
Figure 17A:
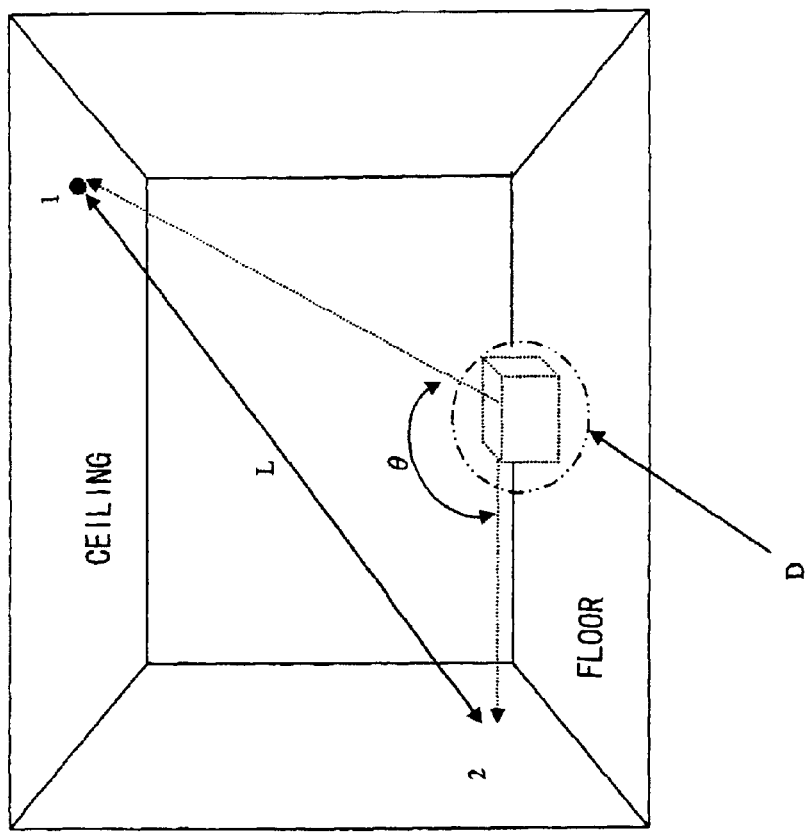
FIG. 17A is a perspective view of measurement of two points between wall and ceiling of the same.
Figure 18:
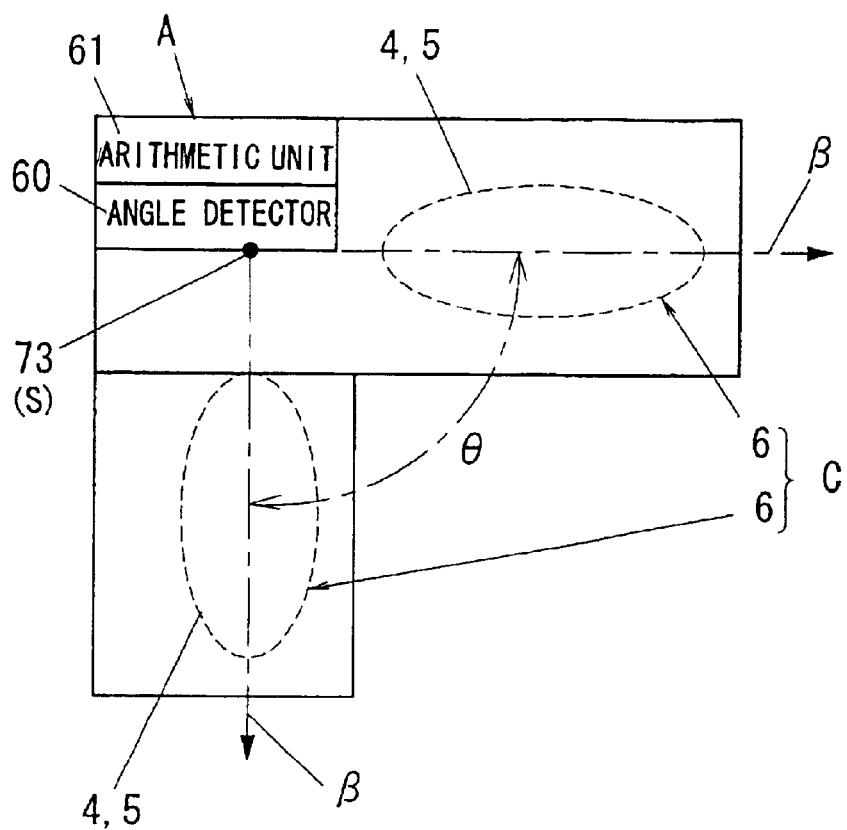
FIG. 18 is a schematic structural diagram of two independent detectors of the same.

As shown in FIGS. 17A and 17B, two independent detectors 6, 6 are opened about the axis of rotation 73, and light beams are emitted to objects 1, 2 in two directions (in this example, wall and ceiling, or wall and confronting wall), and the reflected lights from the objects 1, 2 are received, and the distance to the objects 1, 2 is measured. At this time, the intersecting angle θ of projection axes β of the two detectors 6, 6 is detected by the angle detector 60, and this angle data and the distance measurement data obtained from the two detectors 6, 6 are put into the arithmetic unit 61, and the distance L between two points is calculated by the arithmetic unit 61. Thus, by one measuring operation, the distance L between objects 1, 2 in two directions can be measured in a short time. Therefore, unlike the prior art, it saves the time and labor of measuring the distance between objects by reference to one of the objects in plural directions, and the distance between two arbitrary points can be measured easily and precisely without requiring any experienced or skilled operator. Further, since the two independent detectors 6, 6 for composing the distance measuring unit C are integrated by way of the axis of rotation 73, the structure is simplified and compact, and it is easy to carry, and the entire measuring system can be reduced in size.

As other example of the angle detector 60, an angle sensor of volume type may be used. In this case, by taking out the change of electric resistance of the angle sensor as a signal of angle change of the two detectors 6, 6, the angle detector 60 may be composed at low cost. Although not shown in the drawings, the angle detector 60 may be composed of a protractor for measuring the angle θ of the two detectors 6, 6 visually, and an input device for putting the angle value read from the protractor into the arithmetic unit 61. As a result, the structure of the angle detector 60 is simplified, and data transmission and reception structure between the angle detector 60 and arithmetic unit 61 is simplified, and therefore not only the angle detector 60 but also the entire laser distance measuring apparatus can be presented at low cost.

Figure 16A:
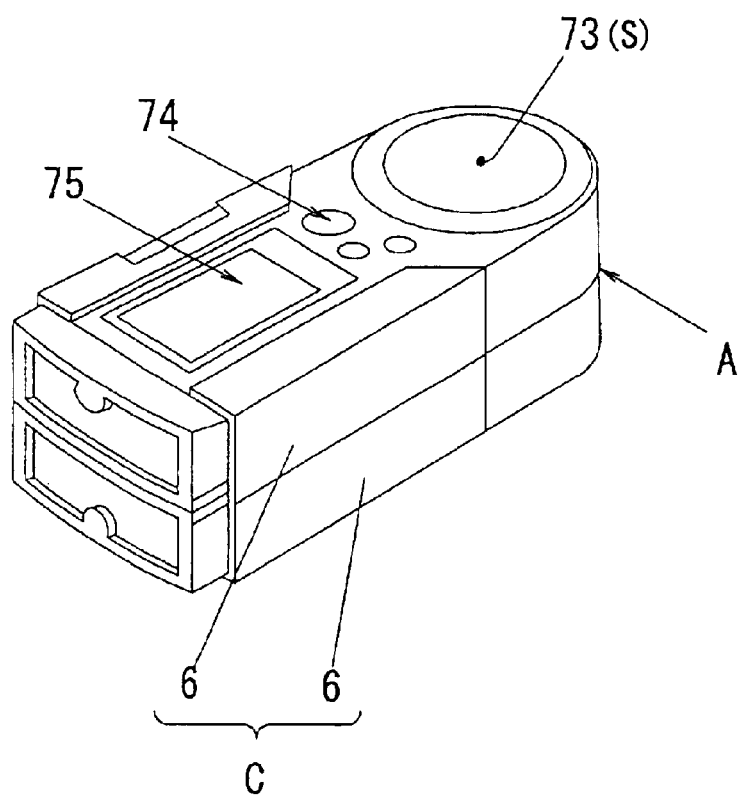
FIG. 16A shows a laser distance measuring apparatus in an embodiment of the invention, being an appearance view of closed state of two independent detectors.
Figure 16B:
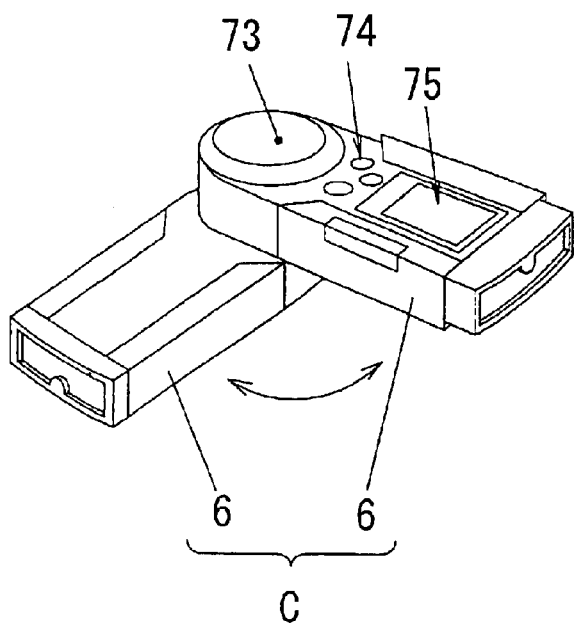
FIG. 16B is an appearance view of opened state of two independent detectors.

Incidentally, when the two detectors 6, 6 are connected by overlaying in the axial direction of the axis of rotation 73 as shown in FIGS. 16A and 16B, the projection axis β of light beam from each detector 6 may be deviated in the axial direction, and as compared with the projection angle β located on a same plane, a slight error may occur in the angle detection. Accordingly, to correct the detection angle error, preferably, a correction circuit may be provided to enhance the angle detection precision. The reference point may be set at the leading end of each detector 6, instead of the axis of rotation 73.

Figure 19:
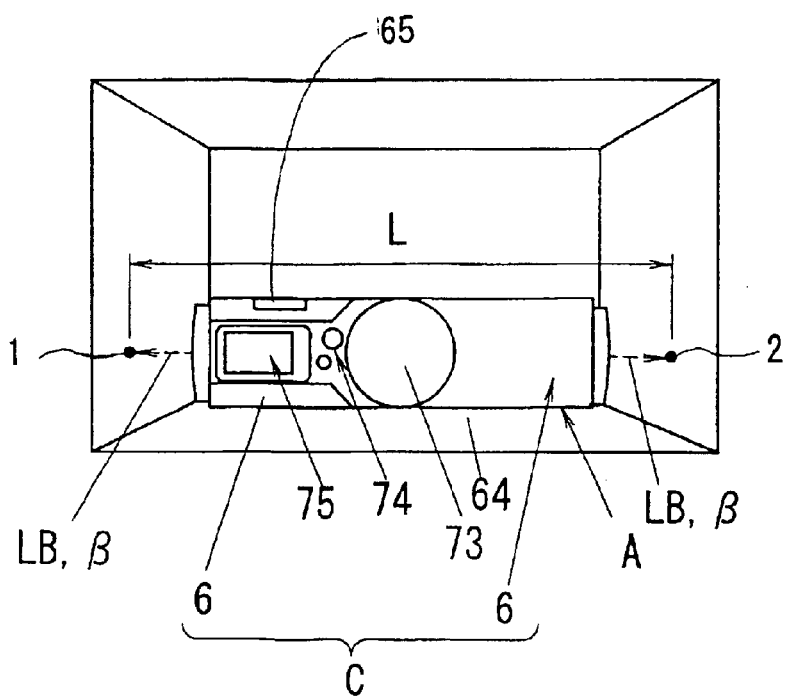
FIG. 19 is a perspective view of distance measuring operation in the horizontal direction in other embodiment.

FIG. 19 shows a further different example. When measuring the distance in the horizontal direction, an installation plane 64 of distance measuring unit C is on a floor or horizontal platform, the two detectors 6, 6 are opened by 180 degrees, light beam LB from one detector 6 is emitted to one wall, and light beam LB from other detector 6 is emitted to other confronting wall. In this case, by holding the projection axis β horizontal to the installation plane 64, the distance L between two points having an arbitrary angle θ can be measured simultaneously and accurately without moving one laser distance measuring apparatus A. The distance measuring unit C includes a level vial 65 for checking the horizontality.

Figure 20:
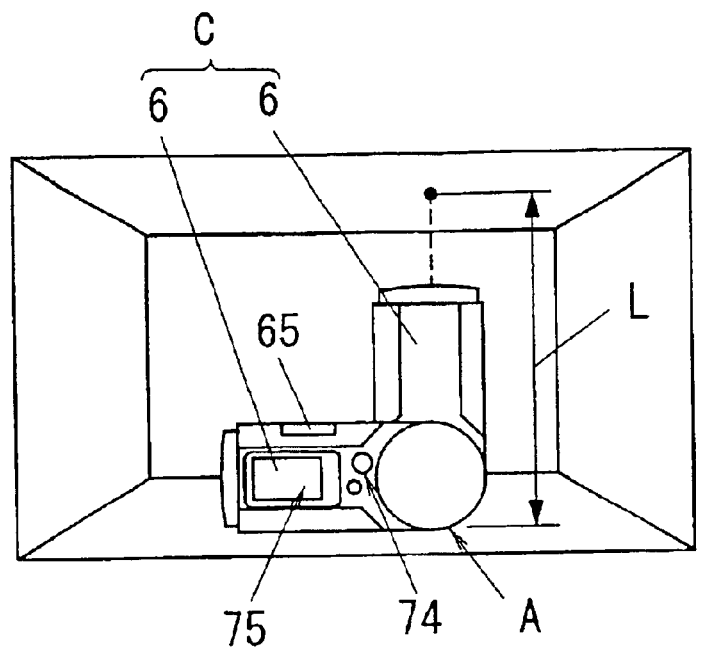
FIG. 20 is a perspective view of installation of level vial in other embodiment.
Figure 21:
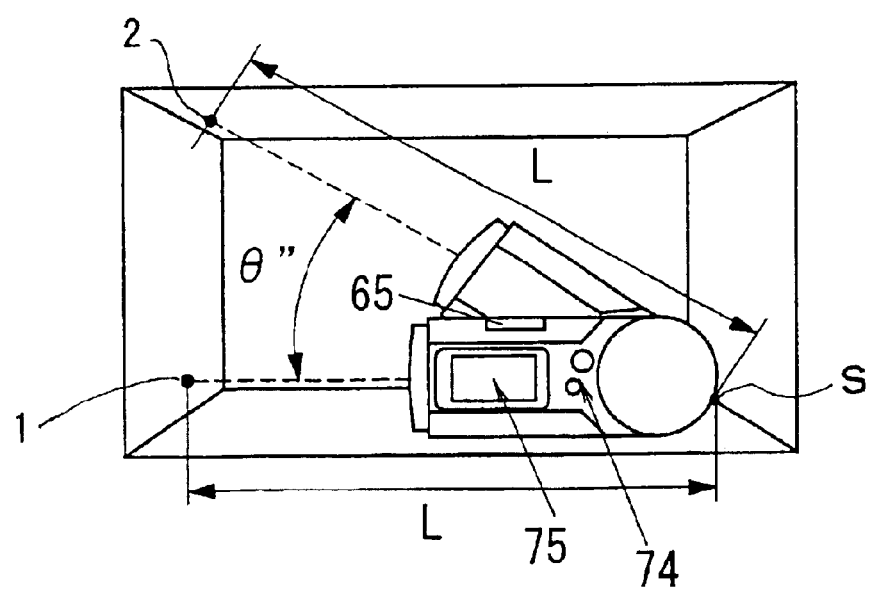
FIG. 21 is a perspective view of measurement of distance between two points having an acute angle by using the apparatus with the level vial of the same.
Figure 23A:
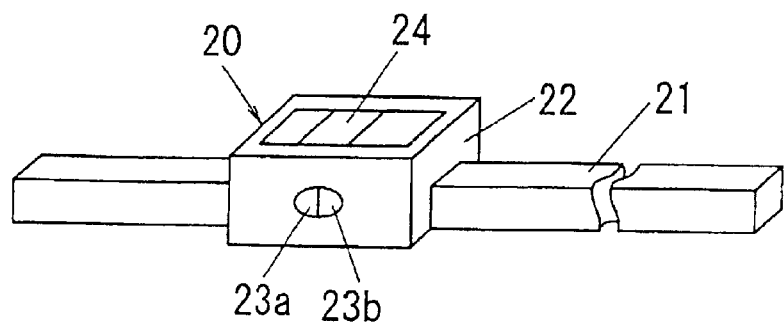
FIG. 23A is a perspective view of a conventional measuring apparatus.
Figure 23B:
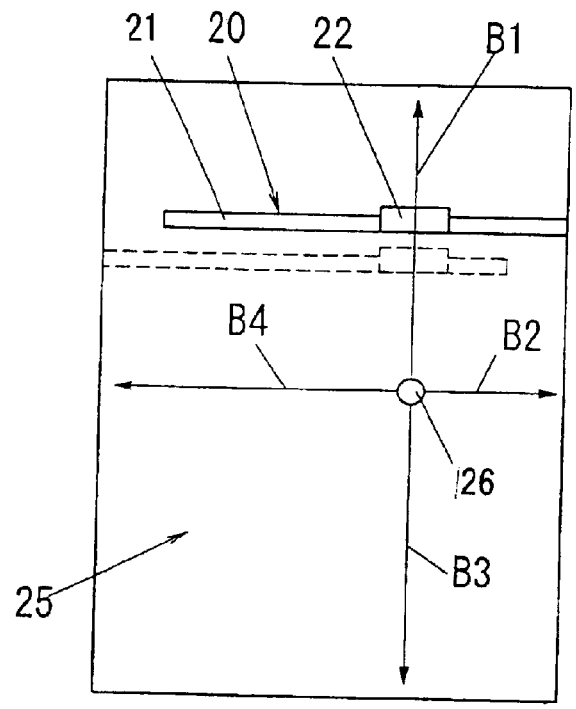
FIG. 23B is an operation explanatory diagram of the same.
Figure 24A:
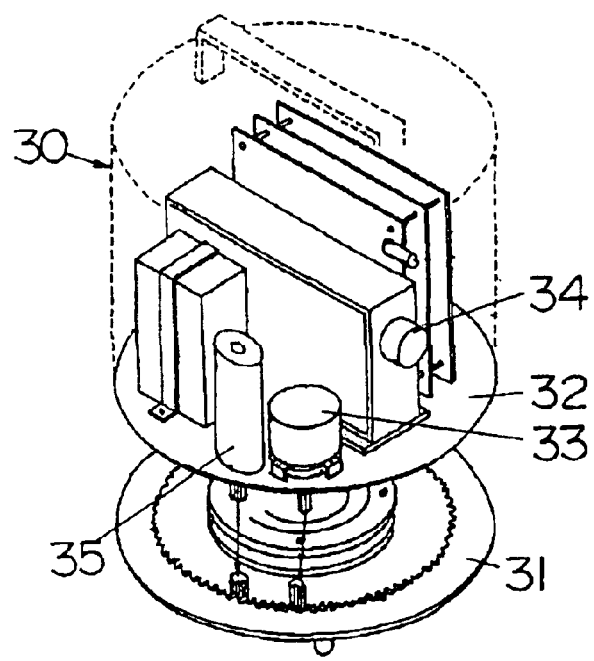
FIG. 24A is a perspective view of other conventional measuring apparatus.
Figure 24B:
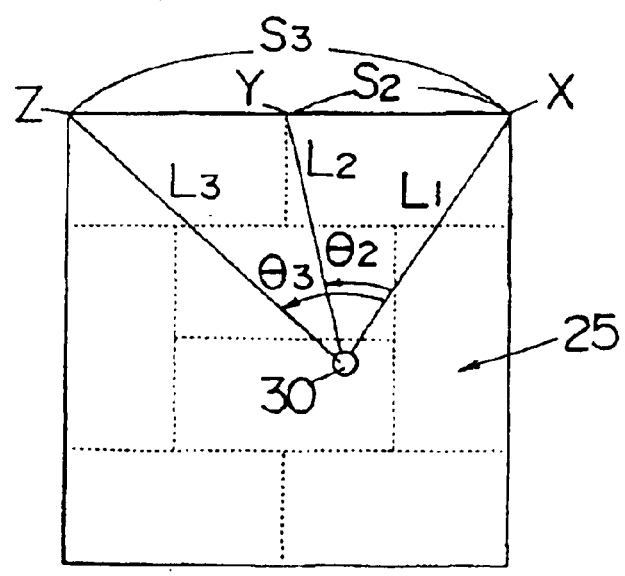
FIG. 24B is an operation explanatory diagram of the same.

FIGS. 20 and 21 show application examples. FIG. 20 shows a case of measuring in the vertical direction, and FIG. 21 shows a case of measuring distance between two points having an acute angle 0". Above mentioned embodiment shown in FIGS. 17A and 17B correspond to a case of having an obtuse angle θ. When measuring distance L between two points having an arbitrary angle θ, if the distance measuring unit C is not horizontal, the collected distance measuring results are not correct. Accordingly, by confirming the horizontal configuration of the projection axis β of each light beam LB and distance measuring unit C when the two detectors 6, 6 are opened by means of the level vial 65, the distance L between two points can be measured accurately regardless of horizontality of the installation plane 64.

The level vial 65 is not limited to uniaxial type, but biaxial type may be also used. When used in measurement of distance between two points in the horizontal direction, a uniaxial level vial is used. When used in measurement of distance in the vertical direction, it is required to be horizontal in two directions, and hence a biaxial level vial is used. At this time, by detecting the inclination of one detector 6, and an inclination in a vertical direction to this inclination, it is adjusted so that the both inclinations may be zero, and the distance in the vertical direction can be measured accurately.

This apparatus may further comprise a detachable manual adjustment mechanism (not shown) for detecting the horizontal level visually, and adjusting manually so that the distance measuring unit may be maintained horizontal. As a result, if the installation plane of the distance measuring unit is inclined, the distance measuring unit can be held horizontal manually, regardless of inclination state of the installation plane of the laser distance measuring apparatus, and accurate distance measuring process is possible on the basis of the horizontal state. In a further example, the apparatus may comprise a detachable automatic adjustment mechanism for detecting the horizontal level of the level vial, and adjusting automatically so that the distance measuring unit may be maintained horizontal. In this case, it may further include transmitting means for transmitting the data about the horizontal level from the level vial to the arithmetic unit, and a driving unit for driving the automatic adjustment mechanism, and the arithmetic unit may be designed to issue a signal for driving the automatic adjustment mechanism to the driving unit on the basis of the data about the horizontal level from the level vial. As the level sensor, for example, a bubble level sensor may be used. When inclined, the bubble level sensor shuts off the current by its bubble to prevent from flowing, and a current amount depending on the inclination is produced. As automatic adjustment mechanism, for example, the horizontality may be adjusted by driving right and left drive shafts on the basis of the data from one level vial inclined in the lateral direction, and driving the front and rear drive shafts on the basis of the data from other level vial inclined in the longitudinal direction. In other example, an automatic adjustment mechanism may be provided integrally in the apparatus, in the distance measuring unit where the level vial is installed, for detecting the horizontal level of the level vial and adjusting automatically so that the distance measuring unit may be maintained horizontal.

A further different example is explained by referring to FIGS. 22A, 22B and 22C. The apparatus in this example has a function of storing the data combining the rotational angle as intersecting angle of light beams of two detectors 6, 6, and the distance measured at this rotational angle. Where a step is formed between both ends of the planes to be measured, as shown in FIG. 22A, while the light beam from one detector 6 is emitted still at one end of the plane to be measured, other detector 6 is rotated, and as shown in FIG. 22B, the rotational angle is widened (from θ1 to θ2) until the light beam from other detector 6 moves from one end 1' of the plane to be measured 86 to other end 2' of convex plane to be measured 87. Thus, by storing the angle data detected by the angle detector and each value of distance measured at each angle θ in the arithmetic unit, a three-dimensional profile of the plane to be measured shown in D in FIG. 22C can be restored from the stored data. The combined data may be also stored in an external storage medium. Further, a communication mechanism for communicating with an external information appliance may be provided in the distance measuring unit.

The invention is not limited to the configuration of the foregoing embodiments, but may be changed or modified within the scope not departing from the true spirit of the invention. For example, when the projection axis is varied by rotating one detector with respect to other detector, if one projection axis is in a relation of parallel move with respect to other one, owing to the structure of axis of rotation, the deviation may be corrected when calculating the distance between two points in the distance calculation processor. Herein, in the closed state of a set of detectors, a vertical stack-up structure (see FIGS. 16A and 16B) is shown, but instead of vertical stack-up structure, the right and left detectors may be set side by side about the axis of rotation within a same plane.

The present disclosure relates to subject matter contained in priority Japanese Patent Application Nos. 2002-185273, filed on Jun. 25, 2002, and 2002-371060, filed on Dec. 20, 2002, the contents of both are herein expressly incorporated by reference in their entireties.

What is claimed is:

1. A laser distance measuring apparatus for measuring the distance between objects existing in two directions at least as seen from the apparatus by using laser light, comprising:

at least two projectors for projecting laser beams along a specified projection axis toward each one of the objects, a photo detector for receiving reflected light of projection from each object, a distance measurement processor which measures the distance from a reference point of the apparatus to each object on the basis of the reception signal by the photo detector, and a distance calculation processor which calculates the distance between the objects on the basis of the distance data measured by the distance measurement processor and an angle formed by at least two projection axes, wherein the projection axis by one projector is variable in angle with respect to the other one.

2. The laser distance measuring apparatus of claim 1, wherein the projectors and photo detector compose a detector, and plural sets of detectors are provided, and plural distance measurement processors are provided corresponding to the plural sets of detectors, and are capable of measuring the distance in plural directions by one distance measuring operation.

3. The laser distance measuring apparatus of claim 1, wherein the projector has one light source, and the light beam from one light source is separated in two directions and emitted toward two objects.

4. The laser distance measuring apparatus of claim 1, wherein the projector has semiconductor laser of both-side emission for projecting light beams in two directions.

5. The laser distance measuring apparatus of claim 1, wherein the photo detector has one sensor for detecting reflected lights from plural objects sequentially by way of plural optical fibers.

6. The laser distance measuring apparatus of claim 1, further comprising a beam splitter capable of changing over freely between a state positioned on the optical path of the reflected light and a state dislocated from the optical path, wherein reflected lights from plural objects are received by changing over sequentially by a single photo detector.

7. The laser distance measuring apparatus of claim 1, wherein the distance measurement processor is only one, and measures each distance to plural objects sequentially by changing over signal reception from the plural photo detectors.

8. The laser distance measuring apparatus of claim 1, wherein a half-mirror is disposed on the optical path of the reflected light, and reflected lights from plural objects can be received by one photo detector by means of the half-mirror.

9. The laser distance measuring apparatus of claim 1, wherein the detector including the projector and photo detector is provided in two independent pieces, each being provided rotatably about the axis for varying arbitrarily the angle formed by the projection axis of the light beam, including an angle detector for detecting the angle formed by the projection axes, and the angle data obtained by the angle detector is used as the angle formed by two projection axes for calculation of distance by the distance calculation processor.

10. The laser distance measuring apparatus of claim 1, wherein the angle detector comprises a protractor for measuring the angle of the two detectors, and an input device for entering the angle value read from the protractor into the distance calculation processor.

11. The laser distance measuring apparatus of claim 1, wherein the projection axis of at least one light beam when the two detectors are opened is in a parallel configuration to the installation plane of at least one detector.

12. The laser distance measuring apparatus of claim 1, further comprising a level vial for detecting that the installation plane of at least one detector is horizontal.

13. The laser distance measuring apparatus of claim 1, wherein the distance calculation processor has a function of storing the combined data of the rotational angle as the angle formed by light beams of the two detectors and the distance measured at this angle.

14. The laser distance measuring apparatus of claim 1, further comprising a mechanism for adjusting so that at least one detector may be maintained horizontal on the basis of the horizontal level detection result by the level vial.

15. The laser distance measuring apparatus of claim 1, further comprising a function of storing the combined data in an external storage medium.

16. The laser distance measuring apparatus of claim 1, further comprising a function of communicating the combined data with an external information appliance.

* * * * *